United States Patent [19]

Xu

[11] Patent Number: 6,112,233

[45] Date of Patent: Aug. 29, 2000

[54] SAVING AND RETRIEVING A MESSAGE VIA A NETWORK SERVER USING AN INDEX PAGE

[75] Inventor: Yueheng Xu, Beaverton, Oreg.

[73] Assignee: Intel Corporation, Santa Clara, Calif.

[21] Appl. No.: 09/018,405

[22] Filed: Feb. 4, 1998

[51] Int. Cl.[7] .......................... G06F 15/16; G06F 15/173
[52] U.S. Cl. ........................................ 709/217; 709/225
[58] Field of Search ..................................... 709/217, 225

[56] References Cited

U.S. PATENT DOCUMENTS

| | | | |
|---|---|---|---|
| 5,572,643 | 11/1996 | Judson | 395/793 |
| 5,857,074 | 1/1999 | Johnson | 709/217 |
| 5,878,220 | 3/1999 | Olkin et al. | 709/217 |
| 5,911,776 | 6/1999 | Guck | 709/217 |
| 5,923,846 | 7/1999 | Gage et al. | 709/213 |

Primary Examiner—Krisna Lim
Attorney, Agent, or Firm—Blakely, Sokoloff, Taylor & Zafman LLP

[57] ABSTRACT

A method and system for saving and retrieving a message via a network server using an index page. The message is sent by a call to a user of a media computer. To save the message, the message is converted into a message index page if the user is not available to respond to the call. The message index page is transferred to a storage medium accessible to a network server. To retrieve a message, the message index page is accessed through a network server from a remote location via a network. The message index page is converted from the message. The message is saved due to user unavailability to respond to the call. The saved message is downloaded by way of the network server to the remote location via the network using the message index page.

21 Claims, 7 Drawing Sheets

FIG_1

FIG_3

FIG_4

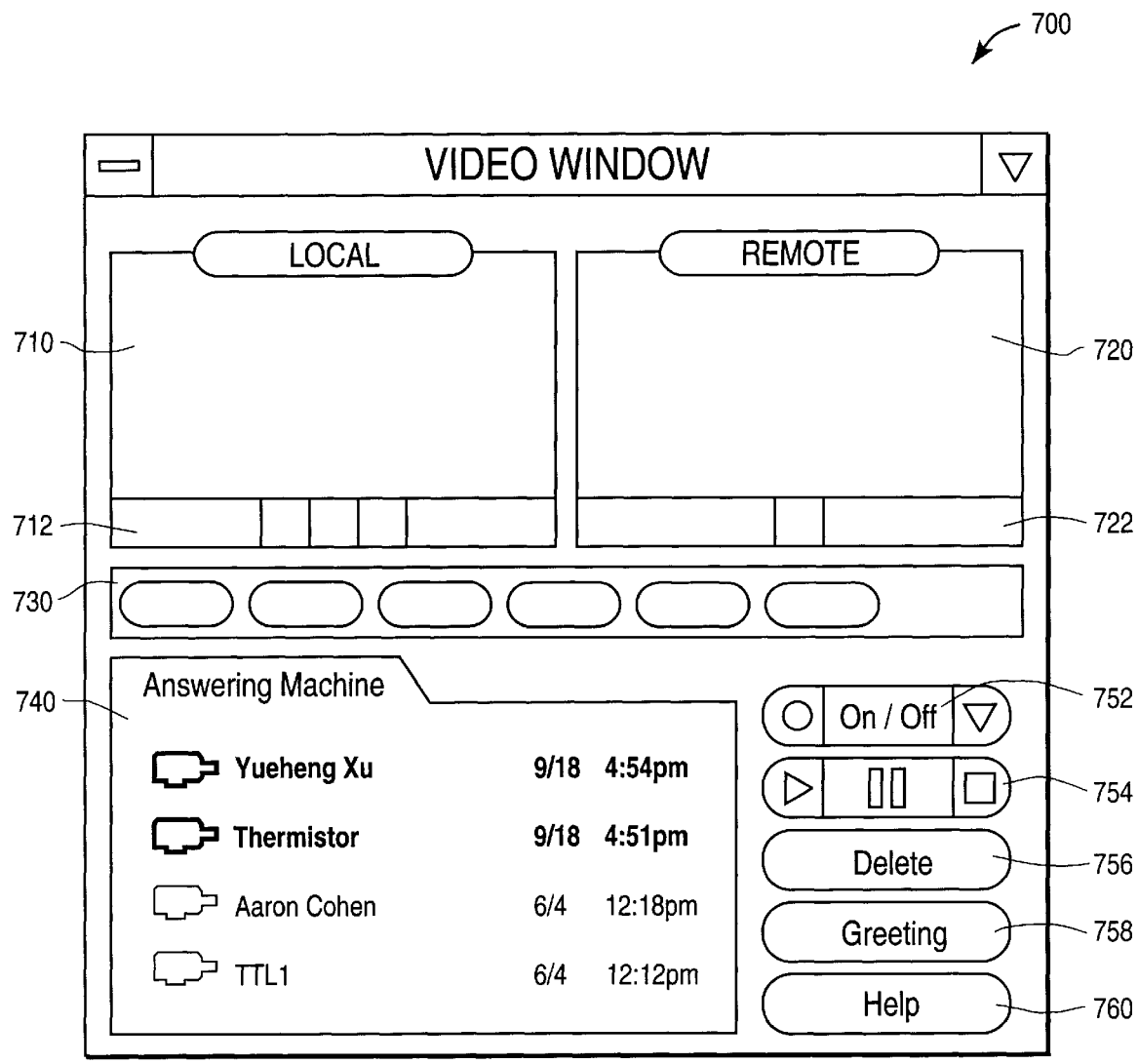
FIG_7

SAVING AND RETRIEVING A MESSAGE VIA A NETWORK SERVER USING AN INDEX PAGE

BACKGROUND OF THE INVENTION

1. Field of the Invention

This invention relates to video and voice mail. In particular, the invention relates to video and voice mail saving and retrieval.

2. Description of Related Art

Video conference systems are now becoming popular to allow participants to meet and interact in real-time at remote sites. When participants are not available for meeting, users can leave a video mail message to be retrieved later in a video answering machine. A video mail message typically includes an image sequence as captured by the remote video camera and a corresponding audio message. A video conference system can also receive an audio message from a telephone via the conventional telephone line. However, the video or audio message left on prior art local video conference machine can only be retrieved from the same machine that receives the message. When the user is away such as on a business trip or vacation, it is not possible to access the message mail system.

With the advent of computer network, it is now easy to have access to the Internet. In particular, the emergence of Web browser has facilitated information retrieval of image and data files over the internet. However, prior art Web browsers cannot download video or audio messages left in a local video conference system.

Therefore there is a need in the technology to provide the ability to retrieve video and audio mail messages remotely via the existing system.

SUMMARY OF THE INVENTION

The present invention discloses a method and system for saving a message in a media computer to be retrieved from a remote location via a network. The system converts a message log containing a pointer to the message into a server message and transfers the server message to be stored in a storage medium accessible to a network server from the media computer.

BRIEF DESCRIPTION OF THE DRAWINGS

The features and advantages of the present invention will become apparent from the following detailed description of the present invention in which:

FIG. 7 is a diagram illustrating a display a message index as viewed at the local answering machine.

DESCRIPTION OF THE PRESENT INVENTION

The present invention discloses a method and system for retrieving video and audio messages remotely via a network. The method converts the existing file on the local machine to the Web browser readable HTML page which is stored on a network server machine. The user can then retrieve the messages by using a Web browser to download the message files via the network.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
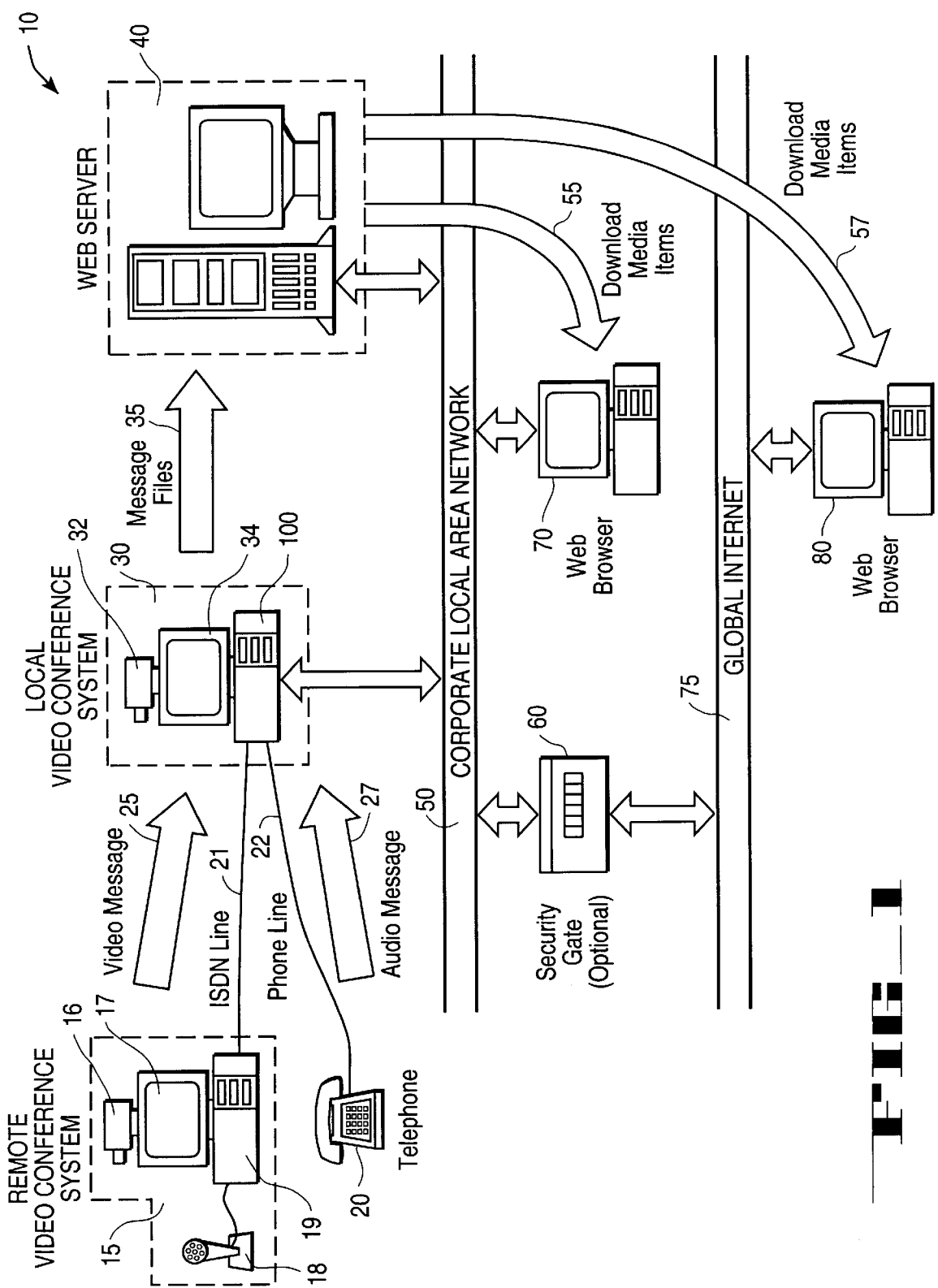
FIG. 1 is a block diagram illustrating one embodiment of a system in accordance with the teachings of the present invention.

Referring to FIG. 1, an illustrative embodiment of a system 10 utilizing the present invention is shown. The system 10 comprises a remote video conference system (VCS) 15, a remote telephone 20, a local VCS 30, a network server 40, a local area network (LAN) 50, a security gate 60, a LAN Web browser 70, a global Internet 75, and a global Web browser 80.

The remote VCS 15 and the local VCS 30 are two video conference systems with appropriate hardware and software support. In one embodiment, the video conference is supported by the Proshare® conferencing video technology available from Intel Corporation. The remote VCS 15 comprises a camera 16, a display monitor 17, a microphone 18, and a computer system 19. The local VCS 30 comprises a camera 32, a display monitor 34, and a computer system 100. For clarity, other devices or components are not shown.

A caller using the remote VCS 15 inititates a video conference call to the local VCS 30. In one embodiment, the connection between the remote VCS 15 and the local VCS 30 is via a communication channel 21. Examples of the communiction channel includes an ISDN line, a wireless communication channel, a local area network (LAN), or even an internet. In a typical scenario, the remote VCS 15 places a video conference call to the local VCS 30. If the local VCS 30 user is available, the call is answered and a video conference session begins. If the local VCS 30 user is not available, the scenario that is applicable for the present invention, the local VCS 30 invokes the video answering machine. The remote VCS 15 user leaves a video message 25 in the local VCS 30. The video message 25 is saved in the local VCS 15 and transferred to the network server 40.

The remote telephone 20 user places a telephone call to local VCS 15. In one embodiment, the connection between the remote telephone 20 and the local VCS 30 is via a regular telephone line 22. In alternate embodiments, other audio communication links may be employed. If the local VCS 15 user is not available, the remote telephone 20 user leaves an audio message 27 in the local VCS 30. The audio message 22 is saved and transferred to the network server 40.

The local VCS 30 receives video messages from remote VCS 15 and audio messages from the remote telephone 20. The local VCS 30 has a connection to a local area network 50 and Web server 40.

The network server 40 provides an interface between the local VCS 30 and the network. In one embodiment, the network server 40 is a Web server. The network includes corporate LAN 50 and global network such as the Internet 75.

The LAN Web browser 70 is a system with Web browsing capability. Any Web browser software can be used with LAN Web browser 70. Examples of popular Web browsers are Netscape Communicator of Netscape Communication of Mountain View, Calif., and Internet Explorer by Microsoft Corporation of Redmond, Wash. The LAN Web browser 70 allows a user to access files and download media items 55 from the Web server 40.

The optional security gate 60 is a security system to provide network security to the corporate LAN 50. The security gate 60 provides a secure path to connect the LAN 50 to the global Internet 75.

The global Web browser 80 is a system with Web browsing capability. The global Web browser 80 is similar to the LAN Web browser 70, except that the global Web browser 80 is connected to the global Internet 75. The global Web browser 80 allows a user to access files and download media items 57 from the Web server 40.

Figure 2:
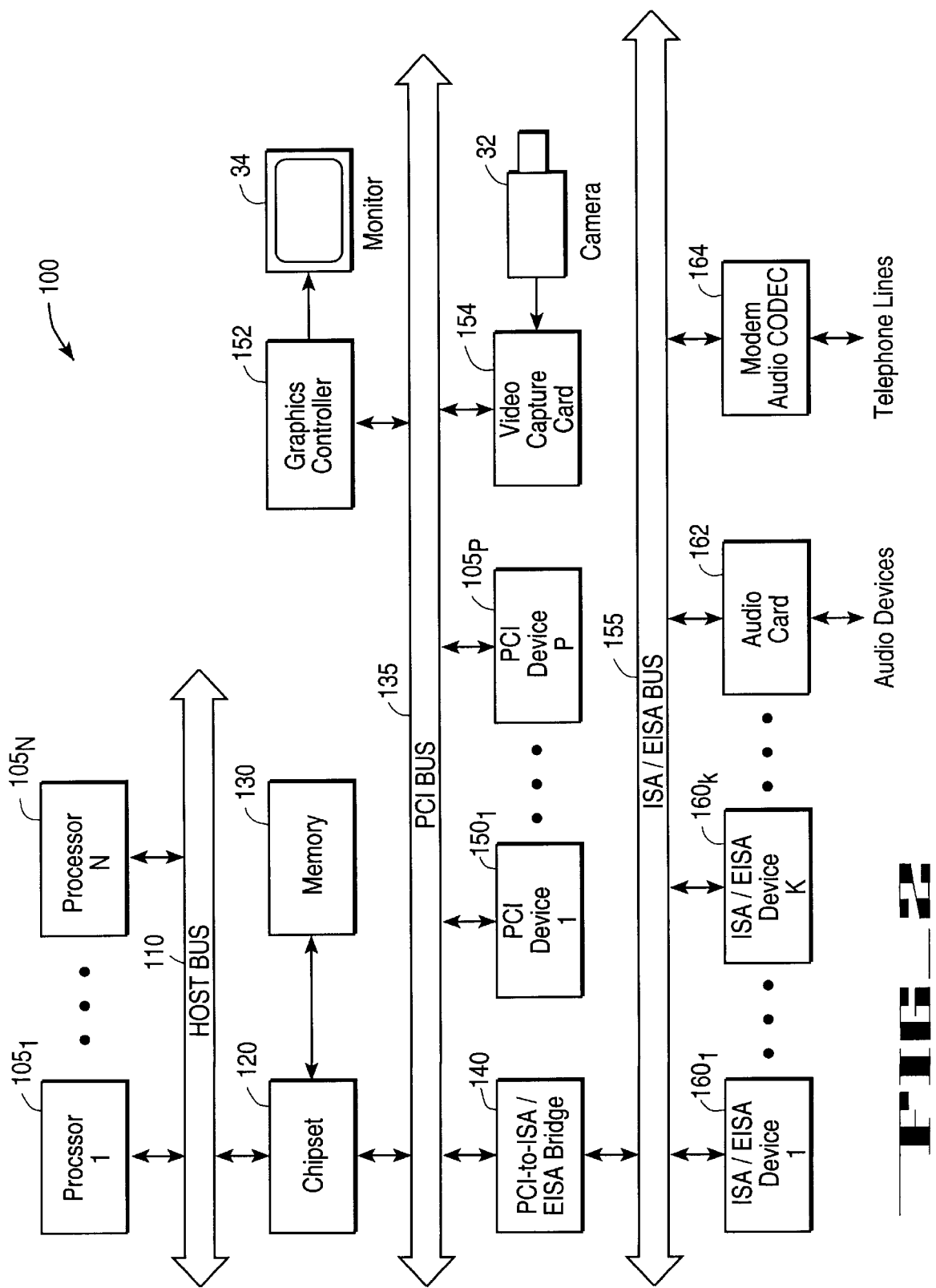
FIG. 2 is a diagram illustrating one embodiment of a video conference system that utilizes the present invention.

Referring to FIG. 2, an illustrative embodiment of a video conference system 30 that operates in accordance with the teachings of the present invention is shown. It is contemplated that the remote VCS 15 is substantially similar to the local VCS 30, although not necessarily to be the case. The local VCS 30 comprises one or more processors $105_1$–$105_N$ ("N" being a positive whole number) and a main memory element 130 (e.g., dynamic random access memory "DRAM", static random access memory "SRAM" etc.) coupled together by a host bus 110 and a chipset 120. In general, the chipset 120 is a host-to-PCI bridge which operates as an interface between a host bus 110 and a peripheral PCI bus 135. The main memory 130 also includes a non-volatile memory or separately powered memory (e.g., DRAM, SRAM) for saving contents of registers or other memories when power is removed.

Processors $105_1$–$105_N$ are any microprocessors, including those that are capable of handling a pipelined and/or parallel bus. In one embodiment, processors $105_1$–$105_N$ are the Pentium® processors manufactured by Intel Corporation of Santa Clara, Calif.

Chipset 120 typically includes a cache DRAM controller (CDC), a peripheral bus controller, and a data path unit (DPU). The peripheral bus 135 may comprise a Peripheral Component Interconnect (PCI) bus or any other type of bus architecture. The chipset or Host-to-PCI Bridge 120 provides a set of host-to-PCI and PCI-to-host bus transaction translations.

The host bus 110 is a bus that can support transactions to a number of coupled processors. Host bus 110 may be referred to as a parallel bus or multiprocessor bus because it supports parallel operations and multiple processors. It is contemplated that host bus 110 operates in a pipelined manner to increase efficiency. However, these features should not be construed to limit the teachings of the present invention.

The PCI bus 135 provides a communication path between the processors $105_1$–$105_N$ or main memory element 130 and a plurality of peripheral devices $150_1$–$150_P$ ("P" being a positive whole number) a graphics controller card 152 and a video capture card 154. The peripheral devices $150_1$–$150_P$ may include I/O devices such as disk controller, and peripheral components such as DMA controllers, interrupt controllers, and timers. The graphic controller card 152 processes the graphic and image data for displaying on the video monitor 34. The video capture card 154 captures and digitizes the video signal from the camera 32.

The PCI-to-ISA Bridge 140 provides the communication path between the peripheral or PCI bus 135 and the expansion or ISA/EISA bus 155.

The expansion bus 155 may comprise an Industry Standard Architecture (ISA) bus or an Extended Industry Standard Architecture (EISA) bus. The ISA/EISA bus 155 provides a communication path between the peripheral PCI bus 135 and a plurality of expansion ISA/EISA peripheral devices $160_1$–$160_K$ ("K" being a positive whole number), an audio card 162, and a communication network adapter 164. The expansion ISA/EISA peripheral devices $160_1$–$160_K$ may include any suitable devices such as serial communication interface and programmable timers. The audio card 162 includes circuitry to perform audio signal processing. In one embodiment, the audio card 162 is attached to the PCI bus 135. The audio card 162 is interfaced to a number of audio devices such as microphone, cassette or Compact Disk (CD) player, headphones, stereo amplifier, speakers, and joystick musical instrument digital interface (MIDI) connector. The communication network adapter 164 provides the communication interface to the telephone lines or other network channels.

One or more of processors $105_1$–$105_N$ executes the video and audio message mail system program in accordance with the teachings of the present invention. It is contemplated that the local VCS 30 is supported by a multi-process operating system such as the Windows 95® and Windows NT®, available from Microsoft Corp.

Figure 3:
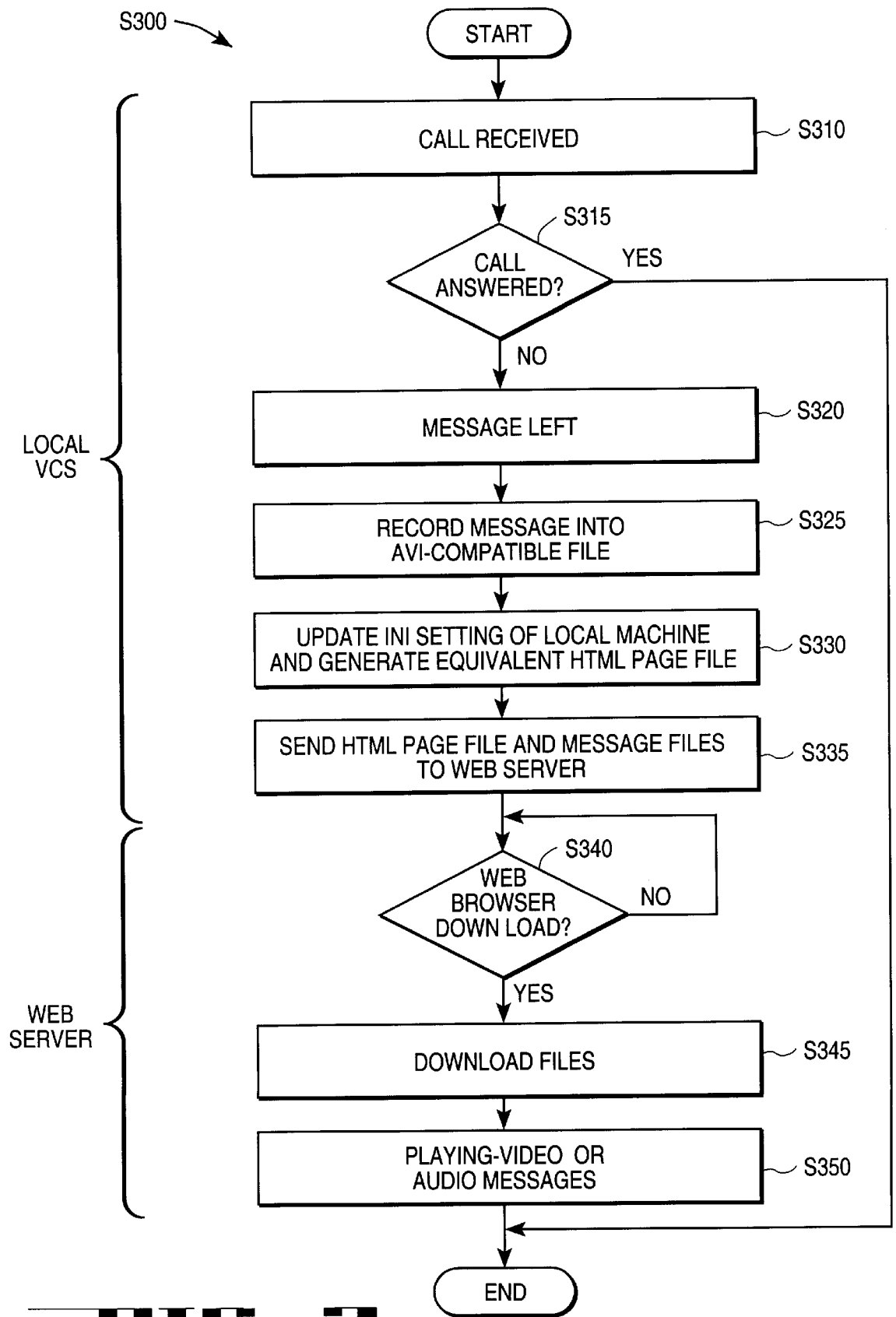
FIG. 3 is a flow diagram illustrating one embodiment of a process to retrieve messages.

Referring to FIG. 3, a block diagram illustrating one embodiment of a system state S300 of the present invention is shown.

From the START state, the system enters step S310. In step S310, the call is received by the local VCS. This call may be a VCS call or a normal telephone call. The system S300 then goes to the decision step S315 to determine if the call is answered. If the user is available, the system goes to the END state because the call will be answered and a conference between the caller and the callee is started. If the user is not available and an answering machine is turned on, the system process enters steps S320. In step S320, a greeting message is played. This greeting message may be video or audio, depending on whether the incoming call is a video call or an audio call. After viewing and/or listening to the greeting message the caller leaves a message on the local VCS. This message may be a video message or an audio message. The message is automatically recorded in audio visual interleave (AVI) compatible file format in step S325.

The system process S300 then enters step S330 to update the .INI files of the local VCS and the HTML file in the network server. The .INI file is used to generate an HTML page file that is browsable by a Web browser. Once the .INI file is updated, the system process S300 transfers the HTML page file as well as the saved video and audio messages to the Web server in step S335. In an alternate embodiment, the HTML page file and the saved AVI files are transferred to a storage medium accessible to the network server. In yet another embodiment, where the server can access the local VCS, the message files are left on the local VCS.

The system process S300 then enters the decision step S340.

In step S340, the system determines if there is a request for downloading the files via the Web browser. If not, the system process S300 goes back to step S340. If there is a request for downloading, the system process S300 enters step S345. In step S345, the requested files are downloaded to the requester's Web browse system via the appropriate network channel. In step S350, the downloaded files are played using the corresponding media instruments available at the local Web browser system. The media player may show the video messages on the screen of the monitor of the Web browser system together with the voice message. The system S300 then goes to the END state to terminate the process.

Figure 4:
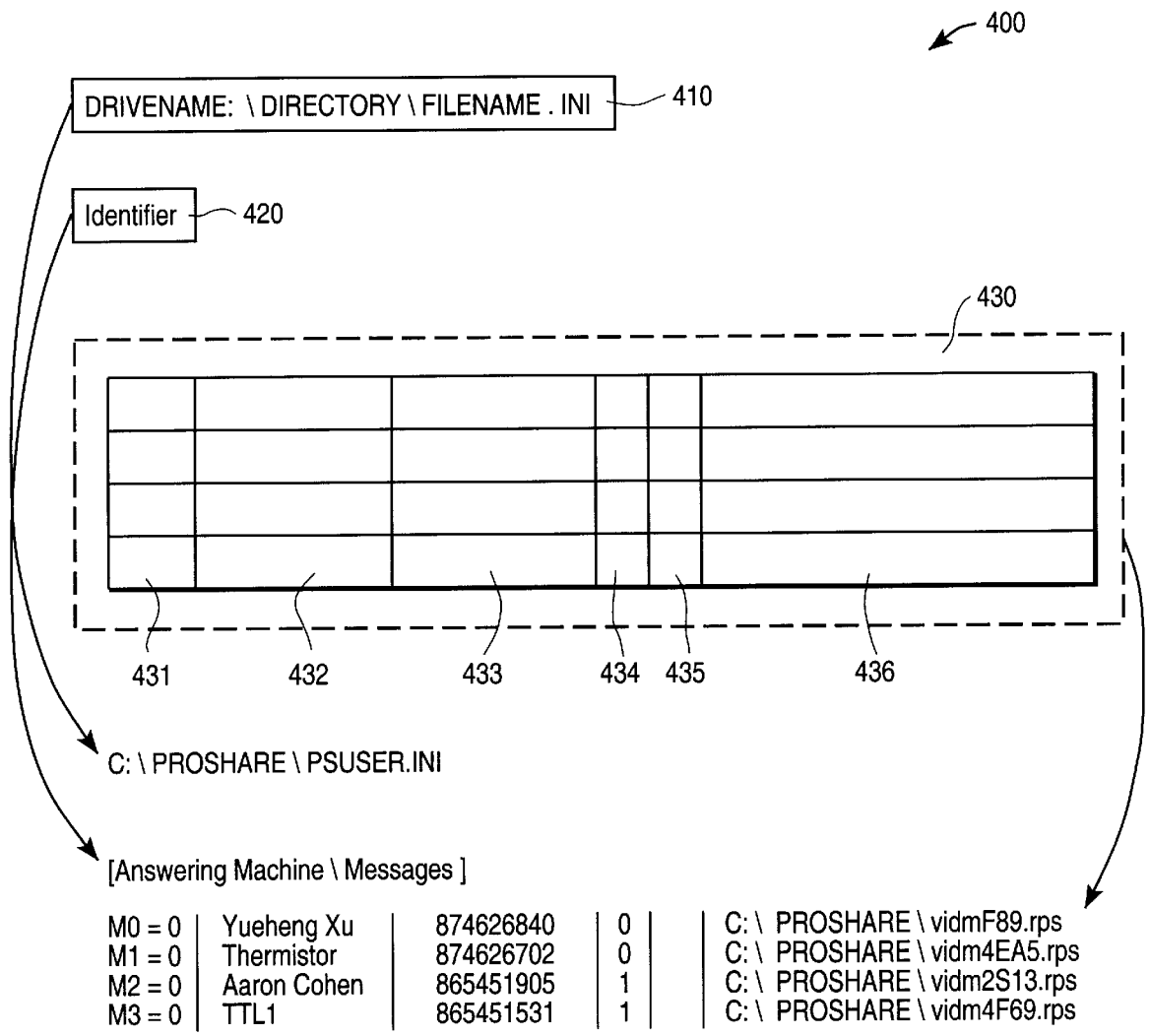
FIG. 4 is a diagram illustrating a format of a file stored by the answering machine in a video conference system.

Referring to FIG. 4, a diagram illustrating an .INI file 400 saved by the local VCS 30. The .INI file 400 includes a file directory 410, a file identifier 420, and a message list 430.

The file directory 410 shows the drive name, the directory, and the file name. In one embodiment, the file directory 410 is automatically created by the video conference system such as the Proshare® by Intel Corporation of Santa Clara, Calif. Under the Windows 95® operating system, the Proshare® system creates an .INI file which contains the list of all the messages stored by the answering machine in the local VCS 30.

The identifier 420 indicates the type of file. In one embodiment, the identifier 420 is the answering machine in the local VCS 30.

The message list 430 lists all the messages saved by the local VCS 30. There are 6 fields in the list: a type field 431, a caller field 432, a date field 433, a new field 434, a reserved field 435, and a message file field 436.

The type field 431 indicates the type of the message. In one embodiment, the type field 434 includes one digit: a 0 indicates a video message, a 1 indicates an audio message. The caller field 432 shows the name of the caller. The date field 433 shows the time and date of the message. The date field 433 may be encoded in a certain format. The new field 434 indicates of the field is old or new. The reserved field 435 is reserved for future use. The message file field 436 contains the message file name and directory.

In the illsutrative example shown in FIG. 4, there are 4 messages, all are video messages. The type field 431 shows the list of 4 messages M0, M1, M2, M3, amd M4, all are type 0 (video). The caller field 432 lists the names of all callers: Yueheng Xu, Thermistor, Aaron Cohen, and TTL1. The date field 433 shows the date encoded in some format. The new field 434 shows that M0 and M1 are new (0) and M2 and M3 are old (1). The message file name field 436 shows that the message files themselves have the names vidmF89. rps, vidm4EA5.rps, vidm2513.rps, and vidm4F69 which correspond to M0, M1, M2, and M3, respectively.

Figure 5:
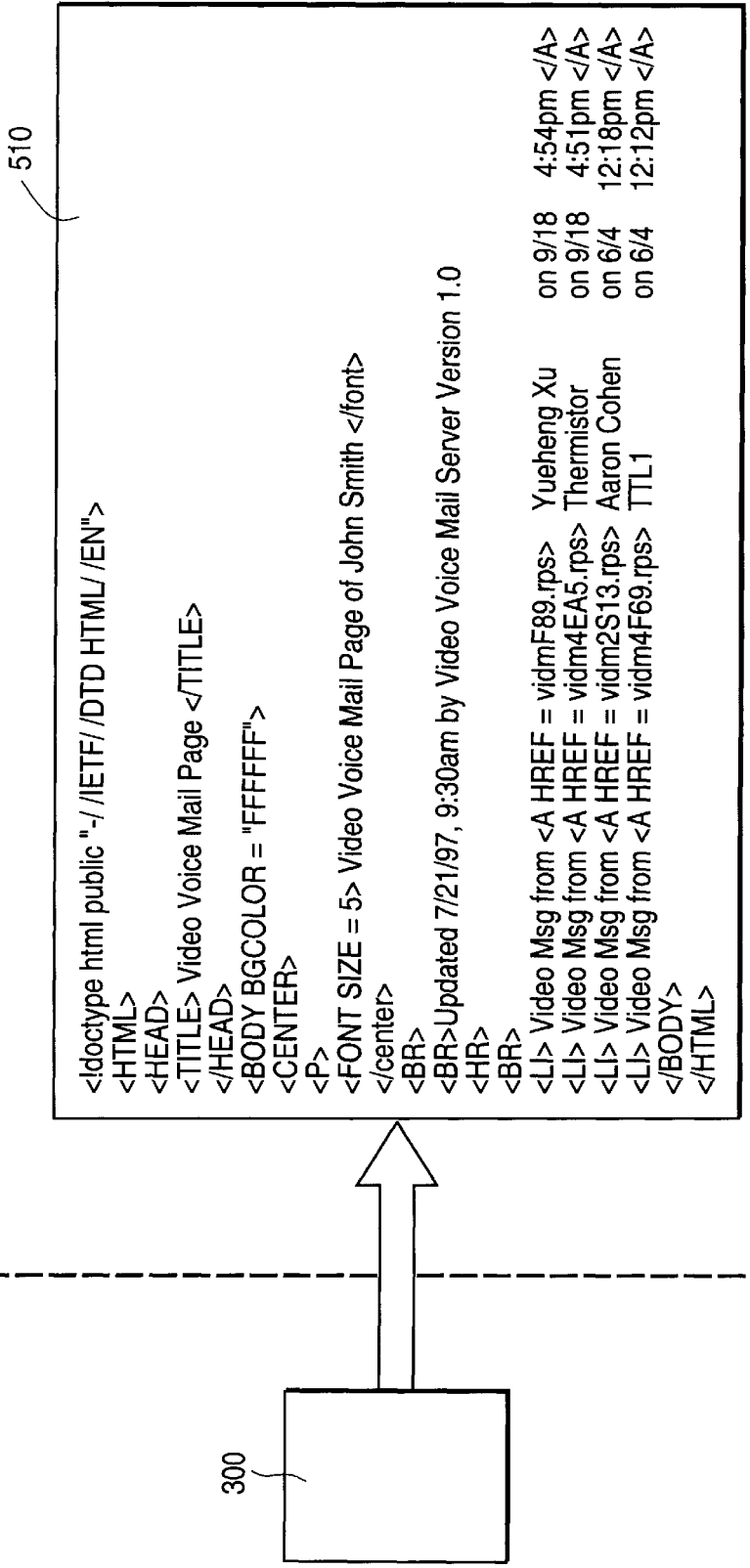
FIG. 5 is a diagram illustrating a format of a file in HTML format stored in a Web server.

Referring to FIG. 5, a diagram illustrating an HTML file 510 which is generated from the .INI file 400 is shown.

The HTML file 510 is generated using the .INI file 400. The generation is done at the local VCS 30 as soon as the first message is saved in the answering machine provided by the Proshare® video conference package and updated whenever an additional message is recorded. The HTML file 510 is transferred to the Web server 40. The transfer can be done in a number of methods. In one embodiment, the transfer is performed by mapping the disk drive on the Web server 40 as the default save drive in the configuration file in the local VCS 30. In another embodiment, the transfer is performed by uploading to the server via any appropriate file transfer protocol.

The HTML file 510 specifies the display format of the message list. Each message name in the message list is linked to the corresponding message file. For example, in the illustrative diagram shown in FIG. 5, the message from Yueheng Xu is linked to the video message file vidmF89.rps.

Figure 6:
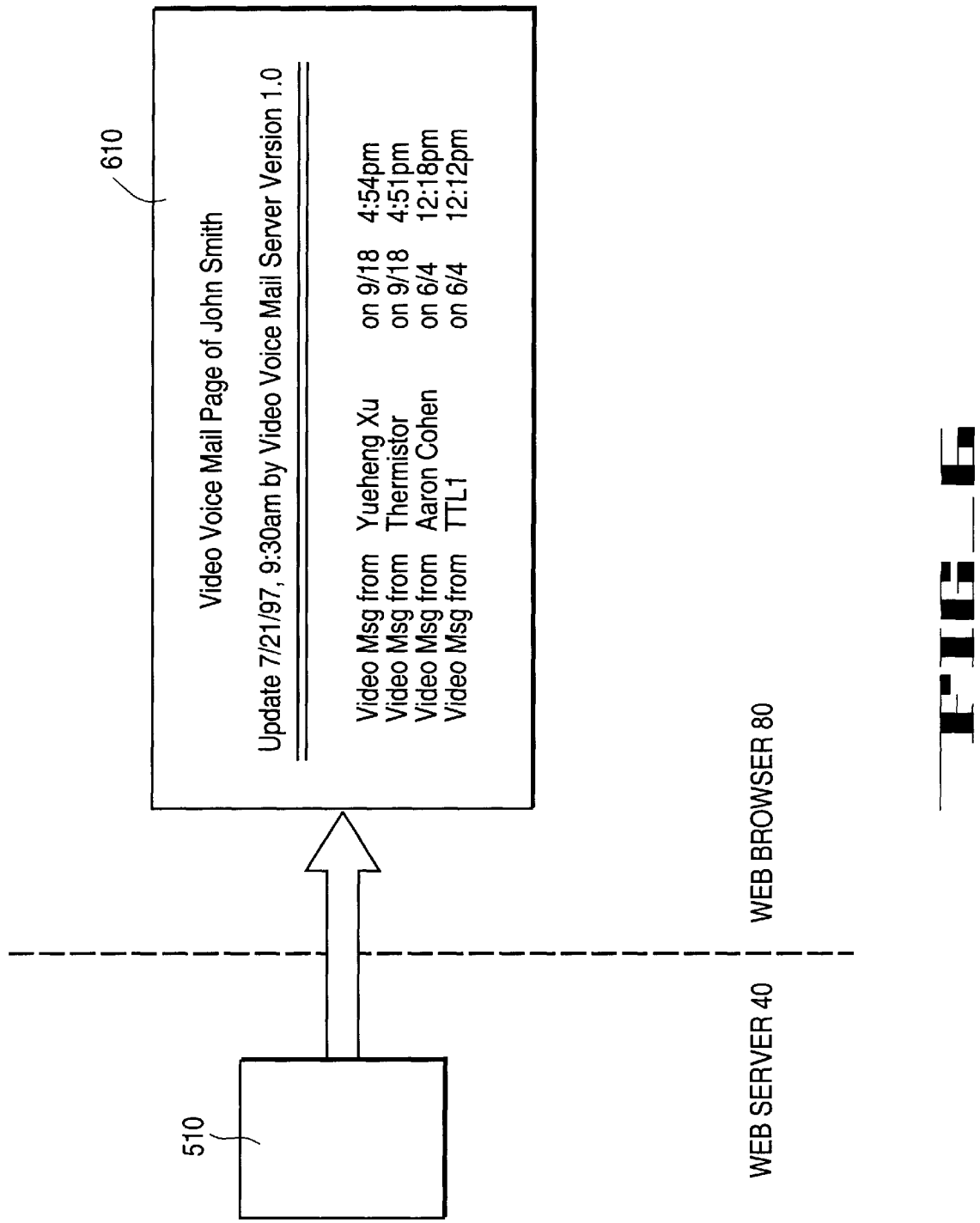
FIG. 6 is a diagram illustrating a display of a file as rendered by a Web browser.

Referring to FIG. 6, a diagram illustrating a Web display 610 as shown by a Web browser.

The Web display 610 is linked to the HTML file 510 when the user accesses the Web server 40 via a remote Web browser 70 or 80. As shown in FIG. 1, the remote Web browser 70 or 80 may be connected to the corporate local area network, or to the global Internet.

Upon linking to the Web server, the user can click on any of the displayed message to request the download of the message media file to be replayed at the Web browser location. The Web browser location is equipped with audio and video devices or components to allow the replay of the corresponding media messages.

Referring to FIG. 7, a diagram illustrating a video window 700 as shown on the monitor of the local VCS. The video window 700 comprises a local sub-window 710, a remote sub-window 720, a local tool/status bar 712, a remote tool/status bar 722, a window tool bar 730, a message list 740, an ON/OFF icon 752, a control icon 754, a delete icon 756, a greeting icon 758, and a help icon 760.

The local sub-window 710 shows the display of the video messages as left by the remote VCS caller. The remote sub-window 720 shows the display of the remote VCS caller when a video conference session is connected.

The local tool/status bar 712 and the remote tool/status bar 722 provide control functions to the local and remote sub-windows, respectively. The window tool bar 730 provides control of the entire video window. The message list 740 includes a list of all messages left by the remote caller. In the example shown in FIG. 7, the list includes 4 video messages left by Yueheng Xu, Thermistor, Aaron Cohen, and TTL 1. The type of the message is indicated by the small icon preceding the caller's name. In one embodiment, a camcorder icon indicates a video message, and a speaker icon indicates an audio message. The color of the message name can be used to indicate how recent the message is. For example, a dark color indicates a new message, while a gray color indicates an old message.

The ON/OFF icon 752 turns the system on or off. The delete icon 756 deletes the message from the message list. The greeting icon 758 is used to replay the greeting from the user of the local VCS. The help icon 760 provides on-line help information.

A similar display of the video windows and the play pause, control icons may also be displayed at the browser site if appropriate decoder and rendering software/hardware are installed.

The present invention thus discloses a method and system to retrieve video or audio messages remotely via a Web browsing network. The method provides a convenient and inexpensive way for a user to retrieve messages left at his or her local video conference system.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for saving a message sent by a call to a user of a media computer, the method comprising:

converting the message into a message index page if the user is not available to respond to the call; and transferring the message index page to a storage medium accessible to a network server.

2. The method of claim 1 wherein the media computer is a video conference system.

3. The method of claim 1 wherein the message is one of a video message and an audio message.

4. The method of claim 1 wherein the network server is a Web server.

5. The method of claim 1 wherein the network is one of a local area network and an internet.

6. The method of claim 1 wherein transferring comprises mapping a drive path to the storage medium on the network server.

7. A method to retrieve a saved message sent by a call to a user of a media computer, the method comprising:

accessing a message index page through a network server from a remote location via a network, the message index page being converted from the message, the message being saved due to unavailability of the user in responding to the call; and downloading the saved message by way of the network server to the remote location via the network using the message index page.

8. The method of claim 7 wherein the network server is a Web server.

9. The method of claim 7 wherein the network is one of a local area network and an internet.

10. The method of claim 7 wherein the index page is a hyper text markup language (HTML) page.

11. A method for facilitating retrieval of a message from a call to a user of a media computer, the method comprising:

accessing a message index page automatically provided by the media computer, the message index page being converted from the message, the message being saved due to unavailability of the user in responding to the call;

providing the accessed message index page to a remote processor; and downloading the saved message to the remote processor.

12. The method of claim 11 wherein the media computer is a video conference system.

13. The method of claim 11 wherein the message index page is a hyper text markup language (HTML) page.

14. A system to retrieve a message sent by a call to a user of a media computer from a remote location via a network, the system comprising:

a network server coupled to the media computer to receive a message index page, the message index page being converted from the message by the media computer, the message being saved due to unavailability of the user in responding to the call; and a network browser located at the remote location to access the network server via the network and to download the message from the network server to the remote location.

15. The system of claim 14 wherein the media computer is a video conference system.

16. The system of claim 14 wherein the message is one of a video message and an audio message.

17. The system of claim 14 wherein the network server is a Web server.

18. The system of claim 14 wherein the network is one of a local area network and an internet.

19. The system of claim 14 further comprises a remote media computer coupled to the local media computer via a communication channel, the remote media computer transferring the message from the remote media computer to the local media computer.

20. The system of claim 19 wherein the remote and local media computers are video conference systems.

21. The system of claim 19 wherein the communication channel is one of an ISDN channel and a telephone line, a LAN connection, an Internet, and a wireless channel.

\* \* \* \* \*